United States Patent
Biteau et al.

(10) Patent No.: US 8,142,896 B2
(45) Date of Patent: Mar. 27, 2012

(54) OPTICAL ARTICLE COMPRISING A MULTILAYER ANTI-REFLECTIVE COATING AND METHOD OF PRODUCTION THEREOF

(75) Inventors: John Biteau, Treasure Island, FL (US); Myriam Fanayar, Nantes (FR); Nathalie Massart, Saint Malo (FR); Dominique Rychel, Paris (FR)

(73) Assignee: Essilor International (Compagnie Generale d'Optique), Charenton Cedex (FR)

( * ) Notice: Subject to any disclaimer, the term of this patent is extended or adjusted under 35 U.S.C. 154(b) by 127 days.

(21) Appl. No.: 12/490,000

(22) Filed: Jun. 23, 2009

(65) Prior Publication Data
US 2010/0033824 A1 Feb. 11, 2010

Related U.S. Application Data

(63) Continuation of application No. 10/567,725, filed as application No. PCT/FR2004/050364 on Jul. 28, 2004, now abandoned.

(30) Foreign Application Priority Data

Jul. 29, 2003 (FR) ..................... 03 50380

(51) Int. Cl.
*B32B 25/20* (2006.01)
(52) U.S. Cl. .............................. 428/447; 528/41; 528/42
(58) Field of Classification Search .................. 428/447; 528/41, 42
See application file for complete search history.

(56) References Cited

U.S. PATENT DOCUMENTS

| 6,129,980 A | 10/2000 | Tsukada et al. ............... 428/327 |
| 6,572,973 B1 | 6/2003 | Taruishi et al. ............... 428/447 |
| 2003/0087102 A1* | 5/2003 | Yamaya et al. ............... 428/419 |

FOREIGN PATENT DOCUMENTS

| EP | 1022587 | 7/2000 |
| EP | 1279443 | 1/2003 |
| EP | 0776925 | 2/2004 |
| JP | 11310755 | 11/1999 |
| JP | 2000-204301 | 7/2000 |
| JP | 2002-235036 | 8/2002 |

OTHER PUBLICATIONS

Office Communication, issued in U.S. Appl. No. 10/567,725, dated Dec. 23, 2008.
Office Communication, issued in U.S. Appl. No. 10/567,725, dated Jul. 11, 2008.

* cited by examiner

*Primary Examiner* — Kuo-Liang Peng
(74) *Attorney, Agent, or Firm* — Fulbright & Jaworski L.L.P.

(57) ABSTRACT

The invention relates to an optical article, for example, an ophthalmic lens, comprising at least one multilayer anti-reflective coating on a transparent substrate made from organic or mineral glass. Said coating comprises successively and starting at the substrate, a layer of material with high refractive index (HI), made from a hybrid organic/inorganic matrix within which are dispersed particles of mineral oxide or chalcogenide with a diameter of 2 to 50 nm and a layer of material with low refractive index (BI), obtained by hardening of a composition comprising at least one silane precursor (I) with 4 hydrolysable groups and at least one fluorosilane precursor (II), said second composition comprising at least 10% in mass of fluorine in a theoretical dry extract and with a molar ratio I/I+II greater than 80%.

29 Claims, No Drawings

OPTICAL ARTICLE COMPRISING A MULTILAYER ANTI-REFLECTIVE COATING AND METHOD OF PRODUCTION THEREOF

CROSS-REFERENCE TO RELATED APPLICATION

This is a Continuation Application of U.S. application Ser. No. 10/567,725 filed Jan. 30, 2006, now abandoned, which is a national stage of PCT/FR04/50364 filed Jul. 28, 2004.

The present invention relates to an optical article, for example an ophthalmic lens, comprising a multi-layer anti-reflection stack on a transparent substrate of organic or mineral glass, said stack exhibiting no loss of adhesion as a result of degradation under the effect of UV radiation.

In the field of ophthalmic optics, it is conventional to coat an ophthalmic lens with various coatings in order to confer to this lens various mechanical and/or optical properties. Thus, conventionally, coatings such as impact-resistant, anti-abrasion, anti-reflection, etc coatings are formed successively on the ophthalmic lens.

The anti-reflection coatings are well known in the field of optics, and in particular in the field of manufacture of ophthalmic lenses, and are conventionally constituted of a mono- or multi-layer stack of dielectric materials such as SiO, $SiO_2$, $Si_3N_4$, $TiO_2$, $ZrO_2$, $Al_2O_3$, $MgF_2$, $Ta_2O_5$, or mixtures thereof.

As is also well known, the anti-reflection coatings are, preferably, multi-layer coatings comprising alternatively layers of high refractive index and layers of low refractive index.

The anti-reflection coatings are applied in a known manner by deposition under vacuum according to one of the following techniques: by evaporation, optionally assisted by an ionic beam, by pulverisation by an ion beam, by cathodic pulverisation, or also by vapour phase chemical deposition assisted by plasma.

Moreover, the anti-reflection coatings are usually not deposited directly onto the transparent substrate, for example a lens, but on impact-resistant primer coatings and anti-abrasion coatings deposited beforehand onto the substrate.

The document EP-A-1279443, for example, which subject is the manufacture of screens for portable computers with good resistance to wear and tear and anti-reflection properties, makes provision for the deposition onto a transparent substrate of a multi-layer stack comprising a protective layer, a layer with a refractive index of at least 1.60 and a layer of low refractive index not exceeding 1.45.

It is also known that the anti-reflection stacks are themselves coated with a hydrophobic top layer ("top coat").

The impact-resistant primer coatings and the anti-abrasion coatings, essentially organic in nature, are usually deposited by dipping or by spinning.

It thus appeared desirable also to be able to deposit the anti-reflection coatings by means of the same techniques, for obvious reasons of simplicity and continuity of manufacture.

Thus, deposition techniques have been developed by means of the sol-gel approach of mineral oxides in a colloidal form in order to achieve anti-reflection coatings.

Of the mineral oxides frequently used, titanium oxide is one of the preferred mineral oxides for the production of certain layers of anti-reflection coatings.

However, other oxides can be used. For example, in the document EP-A-1279443, in addition to $TiO_2$, particular mention is made of ZnO, $Sb_2O_5$, $Y_2O_3$, $La_2O_3$, $ZrO_2$, $Al_2O_3$ or complex oxides.

However, it was observed that the layers containing colloidal titanium oxide had the disadvantage of exhibiting a loss of adhesion with time, probably as a result of degradation under the effect of UV radiation. Such a disadvantage appears in particular in the case of optical articles such as ophthalmic lenses which are subjected to both UV radiation and moisture.

Thus, the object of the present invention is to provide a transparent article comprising a substrate made of mineral or organic glass and an anti-reflection stack which corrects the disadvantages of the prior art while preserving excellent properties of transparency, absence of optical defects such as small cracks, and a capacity to tolerate variations in temperature.

The studies conducted to resolve this problem have shown, in particular, that the formulation of the low index layer played an essential role in the stabilisation of the high index layer and must be defined very accurately.

The subject of the present invention is also a process for the manufacture of an article such as defined above, which is easily incorporated into the conventional process of manufacture and which, in particular, avoids as much as possible the implementation of deposition under vacuum or any other treatment step constituting a break in the manufacturing process of this article.

The above objectives are attained according to the invention by an article comprising a substrate of organic or mineral glass and at least one multi-layer anti-reflection stack which comprises successively and in the order starting from the substrate:

(a) a high index (HI) layer, having a refractive index $n_D^{25}$ of 1.50 to 2.00 and resulting from the hardening of a first hardenable composition and comprising
  (i) an organic-inorganic hybrid matrix resulting from the hydrolysis and condensation of at least one precursor compound containing an epoxy or (meth)acryloxy group and at least two functions hydrolysable to silanol groups, and
  (ii) at least one colloidal metal oxide or at least one colloidal chalcogenide or mixtures of these compounds in the form of particles from 1 to 100 nm in diameter, and preferably from 2 to 50 nm, dispersed within the organic-inorganic hybrid matrix, and directly on this high index (HI) layer,
(a) a low index (LI) layer, having a refractive index $n_D^{25}$ ranging from 1.38 to 1.44 obtained by deposition and hardening of a second hardenable composition and comprising the product of hydrolysis and condensation of:
  (i) at least one precursor compound (I) comprising 4 hydrolysable functions per molecule of formula

in which the groups W, identical or different, are hydrolysable groups and provided that the groups W do not all represent at the same time a hydrogen atom,
  (ii) at least one silane precursor (II) bearing at least one fluorinated group and containing at least two hydrolysable groups per molecule, said second composition comprising at least 10% by mass of fluorine in its theoretical dry extract (TDE), and the molar ratio I/I+II of the precursor compound (I) to the sum of the precursor compound (I)+precursor silane (II)) of the second composition being greater than 80%.

Generally speaking, the theoretical dry extract (TDE) of a composition is the weight of solid matter derived from the constituents of this composition.

By weight of solid matter derived from hydrolysable silanes, in particular from the constituents (I) and (II), is meant the weight calculated in $Q_kSiO_{(4-k)/2}$ units, in which Q is an organic group linked directly to the silicon atom by an Si—C bond and $Q_k SiO_{(4-k)/2}$ is derived from $Q_k SiR'_{(4-k)}$ in which SiR' generates SiOH by hydrolytic treatment and k designates 0, 1 or 2.

In the case of mineral colloids, the weight of solid matter derived from the latter is their weight of dry matter.

As regards the non-reactive catalysts, the weight of solid matter corresponds to their intrinsic weight.

In certain applications, it is preferable that the main surface of the substrate is coated with an anti-abrasion layer or with a primer coating and an anti-abrasion coating.

In a particularly advantageous manner, the mineral particles dispersed in the matrix of the high index layer contain at least one oxide or colloidal chalcogenide selected from the following group: $TiO_2$, ZnO, ZnS, ZnTe, CdS, CdSe, $IrO_2$, $WO_3$, $Fe_2O_3$, $FeTiO_3$, $BaTi_4O_9$, $SrTiO_3$, $ZrTiO_4$, $MoO_3$, $CO_3O_4$, $SnO_2$, bismuth-based ternary oxide, $MoS_2$, $RuO_2$, $Sb_2O_4$, $BaTi_4O_9$, MgO, $CaTiO_3$, $V_2O_5$, $Mn_2O_3$, $CeO_2$, $Nb_2O_5$, $RuS_2$, and mixtures of these compounds. The high index layer may also contain silica $SiO_2$.

The metal oxide dispersed in the high index layer is preferably a composite titanium oxide in the form of rutile.

According to another preferred characteristic, the mineral particles dispersed in the organic-inorganic matrix of the high index (HI) layer have a composite structure based on $TiO_2$, $SnO_2$, $ZrO_2$ and $SiO_2$. Such particles are described in the Japanese patent application JP-11310755.

Metal oxide particles in the form of a composite having a core/shell structure with a core of $TiO_2$, $SnO_2$ in the form of rutile and a shell comprising a mixture of $ZrO_2$ and $SiO_2$ such as described in the Japanese patent application JP-2000-204301 are particularly recommended in the context of the invention.

Moreover, at least 60%, preferably at least 65% and, better still, at least 70% by mass of the theoretical dry extract (TDE) of the low index superficial layer is derived from the precursor compound (I).

The molar ratio I/I+II of the precursor compound (I) to the sum of precursor compound (I)+precursor silane (II) is at least 85%, preferably 90% and, better still, 95%.

In a particularly advantageous embodiment of the invention, the groups W of the precursor compound (I) of formula $Si(W)_4$ are hydrolysable groups which may be identical or different, provided that the four W groups do not simultaneously represent a hydrogen atom. Preferably, these hydrolysable W groups represent a group such as OR, Cl, H, R being alkyl, preferably a $C_1$-$C_6$ alkyl such as $CH_3$, $C_2H_5$, $C_3H_7$.

The anti-reflection stack according to the invention may be only constituted by the combination of two high index (HI)/low index (LI) layers such as defined above. However, this stack may also comprise additional layers.

In particular, it might be more advantageous to apply at least three layers superimposed, respectively starting from the substrate, a medium index layer (MI), a high index layer (HI) and a low index layer (LI), the medium index layer (MI) containing a colloid of mineral particles, metal oxides, chalcogenides or their mixtures dispersed in an organic matrix.

Generally speaking, the medium index layer MI preferably has a refractive index n and a physical thickness e confirming the following relationships:

1.45<n<1.80

40 nm<e<200 nm.

However, in accordance with the desired objective, a stack of three layers (LI/HI/LI) or four layers (HI/LI/HI/LI) might also be produced, the indices and the (physical) thicknesses of the different layers of the stack being selected appropriately in order to obtain the anti-reflection effect according to the techniques known to the person skilled in the art.

These additional high index (HI) and low index (LI) layers may be analogous to those defined according to the invention, but they may also be conventional (HI) and (LI) layers, well known in the art.

Generally speaking, the refractive indices to which reference is made in the present invention are refractive indices at wavelength 550 nm and 25° C.

In a particularly advantageous manner, the layer of material of high refractive index (HI) has a refractive index greater than 1.7, preferably ranging from 1.72 to 1.82, better still from 1.72 to 1.78 and, even better, of the order of 1.77. Its physical thickness may vary from 10 to 200 nm, and from 80 to 150 nm.

As has been pointed out, the refractive index of the low index layer (LI) must be defined very accurately and may vary from 1.38 to 1.44.

The physical thickness of this layer (LI) may vary from 40 to 150 nm and is preferably of the order of 90 nm.

According to the present invention, the anti-reflection stack may be applied to the front surface and/or the rear surface of the substrate, but it is applied preferably to the rear surface.

The invention also relates to a process for the manufacture of such an article as previously defined, comprising the steps of:

depositing onto at least one of the surfaces of the substrate at least one layer of material of high refractive index (HI), by application then hardening of a first hardenable composition (HI) and comprising at least one precursor compound containing an epoxy or a (meth)acryloxy group and at least two functions hydrolysable to silanol groups, at least one metal oxide or at least one colloidal chalcogenide or mixtures of these compounds in the form of particles from 2 to 50 nm in diameter, deposition onto said (HI) layer of at least one layer of material of low refractive index (LI), by application then hardening of a second hardenable composition (LI), preferably free of any mineral charge, and comprising the product of hydrolysis and condensation of:

(i) at least one precursor compound (I) comprising 4 hydrolysable functions per molecule of formula $Si(W)_4$ in which the W groups are hydrolysable groups, identical or different, and provided that the W groups do not all represent a hydrogen atom at the same time, (ii) at least one precursor silane (II) bearing at least one fluorinated group and containing at least two hydrolysable groups per molecule, said second composition comprising at least 10% by mass of fluorine in its theoretical dry extract (TDE), and the molar ratio I/I+II of the precursor compound I to the sum of the precursor compound (I)+precursor silane (II) being greater than 80%.

The studies performed in particular for the development of ophthalmic lenses have shown that the formulation of the low index layer (LI) played an essential role in the stabilisation of the high index layer (HI).

Composition (LI)

Generally, the low index layer comprises at least one precursor compound (I) such as previously defined, preferably a chlorosilane or an alkoxysilane, preferably an alkoxysilane and, better still, a tetra-alkoxysilane or a hydrolysate of the latter, and a precursor silane (II) comprising a fluorosilane containing at least two hydrolysable groups per molecule.

Of the chlorosilanes (I), mention may be made of the compounds of formula $SiCl_4$, $R^1SiCl_3$, $R^1R^2SiCl_2$ and $R^1R^2R^3SiCl$ in which $R^1$, $R^2$ and $R^3$ identical or different, represent a $C_1$-$C_6$ alkoxy group such as a methoxy, ethoxy, propoxy or butoxy group.

Of the tetraalkoxysilanes that can be used as precursor compound (I) in the composition (LI) of the present invention, mention may be made of tetramethoxysilane, tetraethoxysilane, tetrapropoxysilane and tetrabutoxysilane. Tetraethoxysilane should be used preferentially.

The hardenable composition of the low index layer (LI) may comprise only the silanes of the precursor compound (I) and the precursor fluorosilane (II). However, in certain cases, it may also comprise a tri- or dialkoxysilane different from the silanes of the precursor compound (I) of formula $Si(W)_4$ and from the precursor fluorosilane (II) in a proportion by weight not exceeding 20% and preferably not exceeding 10% of the total weight of the silanes present in said composition.

In addition, it is necessary that the content of precursor compounds (I) is very high in order to obtain the desired result. In fact, whereas hitherto a molar proportion greater than 80% was thought to entail the risk of small cracks, it appeared that the molar ratio of the precursor compound (I) to the sum of the precursor compound (I) and the precursor silane (II) could, on the contrary, be of the order of 85%, preferably 90% and even 95%.

As pointed out previously, the precursor silane (II) is a fluorosilane containing at least two hydrolysable groups per molecule.

The precursor fluorosilanes are preferably polyfluoroethers and, better still, poly(perfluoroethers).

These fluorosilanes are well known and are described among others in the U.S. Pat. Nos. 5,081,192; 5,763,061, 6,183,872; 5,739,639; 5,922,787; 6,337,235; 6,277,485 and EP-933 377.

The hydrolysables groups (represented by the letter X in the remainder of the description) of the fluorosilane (II) are linked directly to the silicon atom.

More specifically, of the preferred precursor fluorosilanes, mention may be made of the fluorosilanes of formulae:

1.

in which Rf is a $C_4$-$C_{20}$ fluorinated organic group, R' is a $C_1$-$C_6$ monovalent hydrocarbon group, X a hydrolysable group and a is an integer from 0 to 2; and

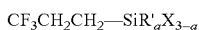

2.

in which R', X and a are as defined previously.

Preferably, Rf is a polyfluoroalkyl group of formula $C_n$-$F_{2n+1}$—$Y_y$ or $CF_3CF_2CF_2O(CF(CF_3)CF_2O)_jCF(CF_3)Y_y$, Y represents $(CH_2)_m$, $CH_2O$, NR'', $CO_2$, CONR'', S, $SO_3$ and $SO_2$NR''; R'' is H or a $C_1$-$C_8$ alkyl group, n is an integer ranging from 2 to 20, y is 1 or 2, j is an integer from 1 to 50, preferably ranging from 1 to 20 and m is an integer from 1 to 3.

Examples of suitable fluorosilanes are:
R'f$(CH_2)_2$Si$(OCH_3)_3$,
R'f$(CH_2)_2$Si$(OC_2H_5)_3$,
R'f$(CH_2)_2$SiCl$_3$,
R'f$(CH_2)_2$Si$(OC(CH_3)$=$CH_2)_3$,
R'f$(CH_2)_2$SiCH$_3$(OCH$_3$)$_2$,
R'f$(CH_2)_3$Si$(OCH_3)_3$,
R'f$(CH_2)_3$SiCH$_3$(OCH$_3$)$_2$,
R'fNH$(CH_2)_2$Si$(OCH_3)_2$,
R'fNH$(CH_2)_3$SiCH$_3$(OCH$_3$)$_2$,
R'fNH$(CH_2)_3$ Si$(OCH_2CH_3)_3$,
R'fNH$(CH_2)_2$NH$(CH_2)_3$ Si$(OCH_3)_3$,
R'fNH$(CH_2)_2$NH$(CH_2)_3$ SiCH$_3$ $(OCH_3)_2$,
R'fNH$(CH_2)_2$NH$(CH_2)_3$ Si$(OCH_2CH_3)_3$,
R'fCONH$(CH_2)_3$Si$(OCH_3)_3$,
R'fCONH$(CH_2)_3$ Si$(OCH_2CH_3)_3$,
R'fCONH$(CH_2)_3$SiCH$_3$(OCH$_3$)$_2$,
R'fSO$_2$NH$(CH_2)_3$Si$(OCH_3)_3$,
R'fSO$_2$NH$(CH_2)_3$Si$(OCH_2CH_3)_3$,
R'fSO$_2$NH$(CH_2)_3$SiCH$_3$(OCH$_3$)$_2$,
R'fCO$_2$$(CH_2)_3$Si$(OCH_3)_3$,
R'fCO$_2$$(CH_2)_3$ Si$(OCH_2CH_3)_3$
and
R'fCO$_2$$(CH_2)_3$ SiCH$_3$(OCH$_3$)$_2$.

R'f represents a $C_nF_{2n+1}$ group (n is an integer from 2 to 20), such as $C_2F_5$, $C_3F_7$, $C_4F_9$, $C_6F_{13}$, $C_8F_{17}$, $C_{10}F_{21}$, $C_{12}F_{25}$, $C_{14}F_{29}$, $C_{16}F_{33}$, $C_{18}F_{37}$ and $C_{20}F_{41}$.

Of the silanes with an ether linkage, mention may be made of:

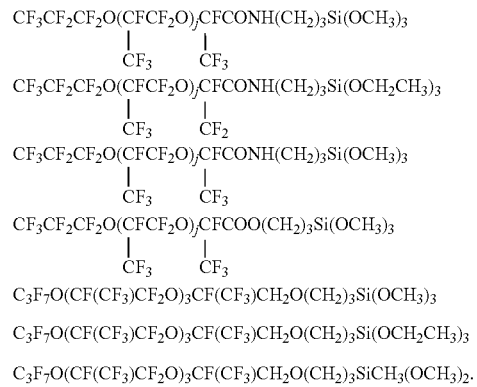

The particularly preferred silanes are:
$C_4F_9(CH_2)_2Si(OCH_3)_3$
$C_4F_9(CH_2)_2Si(OCH_2CH_3)_3$
$C_4F_9(CH_2)_2SiCH_3(OCH_3)_2$
$C_4F_9(CH_2)_2SiCl_3$
$C_8F_{17}(CH_2)_2(Si(OCH_3)_3$
$C_8F_{17}(CH_2)_2Si(OCH_2CH_3)_3$
$C_8F_{17}(CH_2)_2SiCH_3(OCH_3)_2$
$C_3F_7O(CF(CF_3)CF_2O)_3CF(CF_3)CH_2O(CH_2)Si(OCH_3)_3$
$C_3F_7O(CF(CF_3)CF_2O)_3CF(CF_3)CH_2O(CH_2)_3Si$ $(OCH_2CH_3)_3$
and
$C_3F_7O(CF(CF_3)CF_2O)_3CF(F_3)CH_2O(CH_2)_3SiCH_3(OCH_3)_2$ Of the preferred trifluoropropylsilanes, mention may be made of:
$CF_3CH_2CH_2Si(OCH_3)_3$
$CF_3CH_2CH_2Si(OCH_2CH_3)_3$
$CF_3CH_2CH_2SiCl_3$
$CF_3CH_2CH_2Si(OC(CH_3)$=$CH_2)_3$
$CF_3CH_2CH_2SiCH_3(OCH_3)_2$
$CF_3CH_2CH_2SiCH_3(OCH_2CH_3)_2$
and
$CF_3CH_2CH_2SiCH_3Cl_2$ Another class of preferred fluorosilanes are those containing fluoropolyether groups described in U.S. Pat. No. 6,277,485.

These fluorosilanes have the general formula:

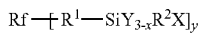

in which Rf is a monovalent or divalent perfluoropolyether group; $R^1$ is a divalent alkylene, arylene group or a combination of the latter, optionally containing one or more heteroatoms or functional groups and optionally substituted by halogens, and preferably containing 2 to 16 carbon atoms; $R^2$ is a lower alkyl group (i.e., a $C_1$-$C_4$ alkyl group); Y is a halide, a lower alkoxy (i.e., a $C_1$-$C_4$ alkoxy group, preferably methoxy or ethoxy), or a lower acyloxy group (i.e., —OC(O)$R^3$ wherein $R^3$ is a $C_1$-$C_4$ alkyl group); x is 0 or 1; and y is 1 (Rf is monovalent) or 2 (Rf is divalent).

The suitable compounds usually have a number average molecular weight of at least 1000. Preferably Y is an alkoxy group and Rf is a perfluoropolyether group.

Other fluorosilanes recommended are those of formula:

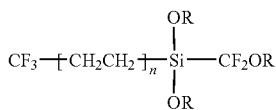

in which n=5, 7, 9 or 11 and R is an alkyl radical, preferably $C_1$-$C_6$ such as —$CH_3$, —$C_2H_5$ and —$C_3H_7$;

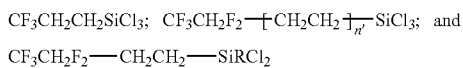

in which n'=7 or 9 and R is as defined above.

Fluorosilanes also recommended are fluoropolymers with organic groups described in the U.S. Pat. No. 6,183,872.

Fluoropolymers with organic groups bearing Si groups are represented by the following general formula and possess a molecular weight of $5.10^2$ to $1.10^5$:

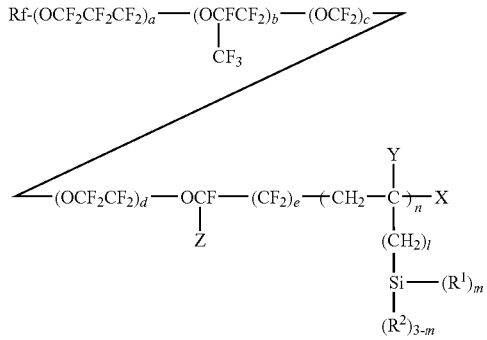

in which Rf represents a perfluoroalkyl group; Z represents a fluoro or trifluoromethyl group; a, b, c, d and e each independently represent 0 or an integer equal to or more than 1, provided that the sum a+b+c+d+e is not less than 1 and that the order of the repetitive units shown in the brackets with the subscripts a, b, d and e is not limited to that shown; Y represents H or an alkyl group comprising from 1 to 4 carbon atoms; X represents a hydrogen, bromine or iodine atom; $R^1$ represents a hydroxy group or a hydrolysable group; $R^2$ represents a hydrogen atom or a monovalent hydrocarbon group; l represents 0, 1 or 2; m represents 1, 2 or 3; and n represents an integer at least equal to 1, preferably at least equal to 2.

A recommended fluorosilane is marketed under the trade name Optool DSX®.

Preferably, tridecafluoro-1,1,2,2-tetrahydrooctyl-1-triethoxysilane ($CF_3(CF_2)_5CH_2CH_2Si(OC_2H_5)_3$) should be used.

The catalyst of the composition (LI) may be any catalyst generally used as catalyst for hardening polyalcoxysilane-based compositions in the usual quantities.

However, as preferred catalysts of hardening mention may be made of amine salts, for example the catalysts marketed by Air Products under the trade names POLYCAT SA-1/10®, DABCO 8154® et DABCODA-20®, tin salts such as the product marketed by Acima under the trade name METATIN 713® and aluminium acetylacetate, in particular 99% aluminium acetylacetate marketed by Sigma Aldrich.

The composition (LI) may also contain one or more surfactants, in particular fluorinated or fluorosiliconised surfactants, usually at a concentration of 0.001 to 1% by weight, preferably 0.01 to 1% by weight with respect to the total weight of the composition. Of the preferred surfactants, mention may be made of FLUORAD® FC430 marketed by 3M, EFKA 3034® marketed by EFKA, BYK-306® marketed by BYK and Baysilone OL31® marketed by BORCHERS.

Composition (HI)

The composition of the high index layer (HI) must also be accurately determined in order to obtain a good resistance, in particular for an article subjected to UV radiation and a humid atmosphere.

The organic-inorganic hybrid matrix of the composition (HI) results preferentially from a silane hydrolysate, preferably of at least an epoxyalkoxysilane. The preferred epoxyalkoxysilanes contain an epoxy group and three alkoxy groups, these latter being directly linked to the silicon atom. The epoxyalkoxysilanes particularly preferred are represented by the formula (I):

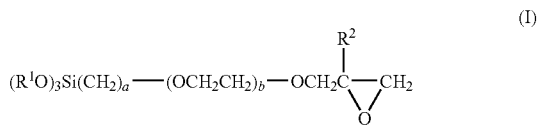

in which:
$R^1$ is an alkyl group of 1 to 6 carbon atoms, preferentially a methyl or ethyl group,
$R^2$ is a methyl group or a hydrogen atom,
a is an integer between 1 and 6,
b represents 0, 1 or 2.

Examples of such epoxysilanes are γ-glycidoxypropyl-triethoxysilane or γ-glycidoxypropyltrimethoxysilane.

γ-glycidoxypropyltrimethoxysilane is used preferentially.

The silane hydrolysate is prepared in a known manner. The techniques presented in the U.S. Pat. No. 4,211,823 can be used.

In a preferred embodiment, the particles dispersed in this matrix have a composite structure based on $TiO_2$, $SnO_2$, $ZrO_2$ and $SiO_2$. In such a structure, titanium $TiO_2$ is preferably in the rutile form, the rutile phase of titanium being less photoactive than the anatase phase.

However, it is possible to use as nanoparticles for the high index layer other photo-active oxides or chalcogenides selected from the following group: $TiO_2$, ZnO, ZnS, ZnTe, CdS, CdSe, $IrO_2$, $WO_3$, $Fe_2O_3$, $FeTiO_3$, $BaTi_4O_9$, $SrTiO_3$, $ZrTiO_4$, $MoO_3$, $CO_3O_4$, $SnO_2$, bismuth-based ternary oxide, $MoS_2$, $RuO_2$, $Sb_2O_4$, $BaTi_4O_9$, MgO, $CaTiO_3$, $V_2O_5$, $Mn_2O_3$, $CeO_2$, $Nb_2O_5$, $RuS_2$.

In the examples which will follow, the product marketed under the trade name Optolake 1120Z® (11RU7-A-8) by the Catalyst & Chemical company (CCIC) was used as a sol of colloidal mineral particles coated with the composition (HI).

As examples of hardening catalysts of the composition (HI), particular mention may be made of the compounds of aluminium, and in particular the compounds of aluminium selected from:

the aluminium chelates, and
the compounds of formulae (II) or (III) detailed below:

$$Al(OCR)_n(OR')_{3-n} \quad \text{(II)}$$
$$\qquad \|$$
$$\qquad O$$

$$(R'O)_{3-n}Al(OSiR''_3)_n \quad \text{(III)}$$

in which:

R and R' are linear or branched chain alkyl groups of 1 to 10 carbon atoms,

R" is a linear or branched chain alkyl group of 1 to 10 carbon atoms, a phenyl group, a group $$—OCR$$
$$\quad \|$$
$$\quad O$$

in which R has the meaning indicated above and n is an integer from 1 to 3.

As is known, an aluminium chelate is a compound formed by reacting an aluminium alkoxide or acylate with sequestering agents free of nitrogen and sulphur, containing oxygen as coordination atom.

The aluminium chelate is preferably selected from the compounds of formula (IV):

$$AlX_vY_{3-v} \quad \text{(IV)}$$

in which:

X is an OL group in which L is an alkyl group of 1 to 10 carbon atoms,

Y is at least a coordinate produced from a compound of formula (1) or (2):

$$M^1COCH_2COM^2 \quad (1)$$

$$M^3COCH_2COOM^4 \quad (2)$$

in which $M^1$, $M^2$, $M^3$ and $M^4$ are alkyl groups of 1 to 10 carbon atoms, and v has the values 0, 1 or 2.

As examples of compounds of formula (IV) mention may be made of aluminium acetylacetonate, aluminium ethylacetoacetate bisacetylacetonate, aluminium bisethylacetoacetate acetylacetonate, aluminium di-n-butoxide monoethylacetoacetate and aluminium dipropoxide monomethylacetoacetate.

As compounds of formula (III) or (IV), those for which R' is an isopropyl or ethyl group and R et R" are methyl groups are selected preferentially.

In a particularly advantageous manner, aluminium acetylacetonate should be used preferentially as hardening catalyst for the composition (HI) in a proportion of 0.1 to 5% by weight of the total weight of the composition.

The compositions (LI) and (HI) of the invention, in particular the compositions (HI) may contain, in addition, an organic solvent the boiling point of which at atmospheric pressure is preferably included between 70 and 140° C.

As an organic solvent that can be used according to the invention, mention may be made of alcohols, esters, ketones, tetrahydropyran and their mixtures.

The alcohols are selected preferably from the lower ($C_1$-$C_6$) alcohols, such as methanol, ethanol and isopropanol.

The esters are selected preferably from the acetates, and mention may be made in particular of ethyl acetate.

Of the ketones, methylethylketone should preferably be used.

Of suitable solvents, mention may be made of:
methanol ($CH_3OH$, Carlo Erba),
1-propanol ($CH_3CH_2CH_2OH$, VWR International),
1-methoxy-2-propanol ($CH_3CH(OH)CH_2OCH_3$, Sigma Aldrich),
4-hydroxy-4-methyl-2-pentanone ($(CH_3)_2C(OH)CH_2COCH_3$, VWR International),
2-methyl-2-butanol ($(CH_3)_2C(OH)CH_2CH_3$ Sigma Aldrich),
butoxyethanol ($CH_3(CH_2)_3OCH_2CH_2OH$, Sigma Aldrich),
mixture water/organic solvents,
or all mixtures of these solvents containing at least one alcohol.

The compositions (HI) and (LI) may also include various additives such as surfactants that promote a better spreading of the composition on the surface to be coated, UV absorbers or pigments.

The anti-reflection coatings according to the invention may be deposited onto any suitable substrate, of organic or mineral glass, for example ophthalmic lenses of organic glass, these substrates being uncoated or optionally coated with anti-abrasion, impact-resistant coatings or other coatings conventionally used.

Of the substrates made of organic glass suitable for the optical articles according to the invention, mention may be made of the substrates made of polycarbonate (PC) and those obtained by polymerisation of the alkyl methacrylates, in particular $C_1$-$C_4$ alkyl methacrylates, such as methyl(meth)acrylate and ethyl(meth)acrylate, the polyethoxylated aromatic (meth)acrylates such as the polyethoxylated bisphenolate dimethacrylates, the allylic derivatives such as the allyl carbonates of aliphatic or aromatic polyols, linear or branched, the thio(meth)acrylics, the substrates made of polythiourethane and polyepisulphide.

Of the substrates recommended, mention may be made of substrates obtained by polymerisation of the allyl carbonates of polyols of which mention may be made of ethyleneglycol bis allyl carbonate, diethyleneglycol bis 2-methyl carbonate, diethyleneglycol bis(allyl carbonate), ethyleneglycol bis(2-chloro allyl carbonate), triethyleneglycol bis(allyl carbonate), 1,3-propanediol bis(allyl carbonate), propylene glycol bis(2-ethyl allyl carbonate), 1,3-butylenediol bis(allyl carbonate), 1,4-butenediol bis(2-bromo allyl carbonate), dipropyleneglycol bis(allyl carbonate), trimethyleneglycol bis(2-ethyl allyl carbonate), pentamethyleneglycol bis(allyl carbonate), isopropylene bis phenol-A bis (allyl carbonate).

The substrates particularly recommended are the substrates obtained by polymerisation of the bis allyl carbonate of diethyleneglycol, sold under the trade name CR 39® by the PPG INDUSTRIES company (ORMA® ESSILOR lens).

Of the substrates also recommended, mention may be made of the substrates obtained by polymerisation of the thio(meth)acrylic monomers, such as those described in the French patent application FR-A-2 734 827.

Quite obviously, the substrates may be obtained by polymerisation of mixtures of the monomers mentioned above.

All primer impact-resistant layers conventionally used for the articles made of transparent polymeric material, such as ophthalmic lenses, may be used as primary impact-resistant layer.

Of the preferred primer compositions, mention may be made of the compositions based on thermoplastic polyurethanes, such as those described in the Japanese patents 63-141001 and 63-87223, the poly(meth)acrylic primer compositions, such as those described in U.S. Pat. No. 5,015,523, the compositions based on thermo-setting polyurethanes, such as those described in the patent EP-0404111 and the compositions based on poly(meth)acrylic latex and polyurethane latex, such as those described in the U.S. Pat. No. 5,316,791 and EP-0680492.

The primary compositions preferred are the compositions based on polyurethane and the compositions based on latex, in particular the polyurethane latexes.

The poly(meth)acrylic latexes are copolymeric latexes constituted principally by a (meth)acrylate, such as for example ethyl or butyl or methoxy or ethoxyethyl(meth)acrylate, with a usually minor proportion of at least one other co-monomer, such as, for example, styrene.

The preferred poly(meth)acrylic latexes are the latexes of acrylate-styrene copolymers.

Such latexes of acrylate-styrene copolymers are commercially available from the ZENECA RESINS company under the trade name NEOCRYL®.

The polyurethane latexes are also known and commercially available.

As examples, mention may be made of the polyurethane latexes containing polyester motifs. Such latexes are also marketed by the ZENECA RESINS company under the trade name NEOREZ® and by the BAXENDEN CHEMICAL company under the trade name WITCOBOND®.

Mixtures of these latexes, in particular polyurethane latexes and poly(meth)acrylic latexes, can also be used in the primer compositions.

These primer compositions may be deposited onto the surfaces of the optical article by dip coating or spin coating, then dried at a temperature of at least 70° C. but not exceeding 100° C., and preferably of the order of 90° C., for a period of 2 minutes to 2 hours, usually of the order of 15 minutes in order to form primer layers having thicknesses, after baking, of 0.2 to 2.5 µm, and preferably 0.5 to 1.5 µm.

The anti-abrasion hard coatings of the optical articles according to the invention, and in particular ophthalmic lenses, may be any anti-abrasion coatings known in the field of ophthalmic optics.

Of the anti-abrasion hard coatings recommended in the present invention, mention may be made of the coatings obtained starting from compositions based on a silane hydrolysate, in particular an epoxysilane hydrolysate, for example those described in the EP 0614 957 and U.S. Pat. No. 4,211,823, or compositions based on (meth)acrylic derivatives.

A preferred composition of an anti-abrasion hard coating comprises a hydrolysate of epoxysilane and dialkyldialkoxysilane, colloidal silica and a catalytic quantity of aluminium acetylacetonate, the remainder being constituted essentially of solvents conventionally used for the formulation of such compositions.

Preferentially the hydrolysate used is a hydrolysate of γ-glycidoxypropyltrimethoxysilane(GLYMO) and dimethyldiethoxysilane (DMDES).

Quite obviously, the anti-reflection coatings of the optical articles according to the invention may optionally be coated with coatings that make it possible to modify their surface properties, such as hydrophobic, anti-fouling coatings. Usually they are materials of the fluorosilane type, several nanometers thick, preferably 1 to 10 nm, better still 1 to 5 nm.

The fluorosilanes used may be the same as the precursor silanes (II) of the composition generating the low index layer, but they are used at high contents or pure in the anti-fouling layer.

In the manufacturing process of an article according to the invention such as previously defined, the compositions (HI) and (LI) according to the invention may be deposited by any known suitable technique: dip coating or spin coating in particular, which is preferred.

The process of the invention may also include, between the deposition of the layer (HI) and that of the layer (LI), a pre-hardening step of the layer (HI) before the deposition of the layer (LI).

This pre-hardening is, for example, an infrared treatment, followed by cooling by means of a stream of air at ambient temperature.

In general, the anti-reflection coatings of the articles according to the invention exhibit reflection coefficients Rm (mean reflection between 400 and 700 nm) comparable to those of the anti-reflection coatings of the prior art. In fact, the anti-reflection coatings according to the invention usually exhibit a value of Rm less than 1.4%.

The definitions of the reflection coefficients (p) at a given wavelength and Rm (mean reflection between 400 and 700 nm) are known to the specialist skilled in the art and are mentioned in the document concerning standards ISO/WD 8980-4.

As has been pointed out, the optical articles according to the invention exhibit special adhesion properties of the layers of the anti-reflection stack to the substrate. The adhesion of the layers of the anti-reflection stack can be determined with the aid of the test N×10 strokes, as described in the international patent application WO 99/49097.

Some examples illustrating the invention in more detail but in a non-limiting manner will now be described.

In order to evaluate the properties of the coated lenses obtained in the examples, it is possible to measure:

the coefficient of reflection (p) at a given wavelength and Rm (mean reflection between 400 and 700 nm) in conformity with the standard ISO/WD 8980-4;

the resistance to abrasion, by the value obtained in the BAYER test performed in conformity with the standard ASTM F735.81. The higher the Bayer value, the greater also is the resistance to abrasion. (For comparison, the Bayer value of an uncoated CR39-based ORMA® glass is 1);

the adhesion of the layers of the anti-reflection stack according to the invention to an organic substrate by using the test N×10 strokes, as described in the international patent application WO 99/49097; this test evaluates the adhesion of the thin layers deposited on the organic substrate by rubbing with a specific eraser and under the conditions (type of eraser and rubbing process) described in the application WO 99/49097;

the resistance to scratching by means of the steel wool test (SW test) which consists of abrading the treated convex face of the lens with steel wool in the sense of the fibres by performing 5 times a forwards and backwards movement, over an amplitude of 4 to 5 cm while applying a constant force on the steel wool (5 kg during the forward, 2.5 kg during the backward movement). The lenses are then inspected visually. A score is assigned according to the following scale:
0 no scratch observed
1 glass only very slightly scratched (1 to 5 scratches)
2 glass slightly scratched (6 to 20 scratches)
3 glass moderately scratched (21 to 50 scratches)
4 glass very badly scratched (more than 50 scratches)
5 uncoated substrate (ORMA® in CR39®).

The proportions, percentages and quantities mentioned in the examples are proportions, percentages and quantities by weight unless otherwise indicated.

In the examples the following abbreviations are used:
γ-glycidoxypropyltrimethoxysilane is designated GLYMO,
the polycarbonate substrates are designated by PC
the ophthalmic lenses made of organic glass constituted of a diethylene glycol di(allylcarbonate) polymer are designated by ORMA®
TDE means theoretical dry extract In order to facilitate comparisons in all the examples, a colloid of $TiO_2$, in particular the commercial product Optolake 1120Z (11RU7-A-8), was used as sol of colloidal mineral particles of the composition (HI).

In a first series of examples, several articles were produced each comprising an organic substrate coated with an antireflection (AG) stack constituted by at least two layers each prepared starting from a hardenable composition of high index (HI), low index (LI) and, optionally, medium index (MI).

For this purpose, several low index, median index and high index compositions of different types were prepared:
$L_1$ and $L_2$ of low index
$M_1$, $M_2$, $M_3$, $M_4$ of medium index
$H_1$, $H_2$, $H_3$, $H_4$ of high index.

These different compositions were prepared in the following manner (the trade names of the products are indicated where applicable):

Low Index Compositions (LI)
L1 of the GLYMO/DMDES/$SiO_2$ Type (Composition not Comprised in the LI Compositions According to the Invention).

7.35 g of 0.1N hydrochloric acid (0.1N HCl, Panreac) were added dropwise to 20.63 g of GLYMO (glycidoxypropyltrimethoxysilane, Sivento) with continual stirring.

The mixture was stirred for a further 15 minutes after the addition of 0.1N HCl was complete. Then 10.8 g of DMDES (dimethyldiethoxysilane, Sigma Aldrich) were added to the hydrolysate. The hydrolysis mixture was stirred at ambient temperature for 24 hours. 66.67 g of 30% colloidal silica in methanol (MA-ST, Nissan USA) and 2.68 g of 99% aluminium acetylacetonate ($[CH_3COCH\!=\!C(O\!-\!)CH_3]_3Al$, Sigma Aldrich) were added. The solution was stirred for 2 h. 1694 g of isopropanol (Carlo Erba) were added. The solution was stirred for 2 hours, filtered through a cartridge of porosity 3 μm, then stored in the freezer at −18° C.

For deposition, 1 mL of this solution was deposited by spin coating onto the lenses.

L2 of the Fluorosilane/TEOS Type
8.1 g of fluorosilane (tridecafluoro-1,1,2,2-tetrahydrooctyl-1-triethoxysilane: $C_{14}H_{19}F_{13}O_3Si$, Roth-Sochiel) were mixed with 65.6 g of tetraethoxysilane ($Si(OC_2H_5)_4$, Keyser Mackay). The mixture was stirred for 15 min. Then 26.3 g of 0.1N hydrochloric acid (0.1N HCl, Panreac) were added. The hydrolysate was stirred for 24 h at ambient temperature. 737.7 g of 2-methyl-2-butanol ($C_2H_5C(CH_3)_2OH$, Sigma Aldrich), 316.2 g of 2-butanone ($C_2H_5COCH_3$, Carlo Erba) and 0.28 g of catalyst (Polycat-SA-1/10, Air products) were added. The solution was stirred for 2 h, filtered through a cartridge of porosity 0.1 μm, then stored in the freezer at −18° C.

For deposition, 1 mL of this solution was deposited by spin coating onto the lenses.

Medium Index Composition (MI)
Different compositions of median refractive index were synthesised with different colloids of $TiO_2$ (compositions of the GLYMO/$TiO_2$ non-rutile type).

M1:
144.15 g of glycidoxypropyltrimethoxysilane (Sivento) were weighed in beaker and stirred.

32.95 g of 0.1N acid (HCl) (Panreac) were added dropwise.

When all of the acid had been added, stirring was continued for a further 15 min.

490 g of colloidal $TiO_2$ (colloid 1120Z(U25-A8) from CCIC, with 20% by weight of dry material) were weighed and added to the hydrolysed glycidoxypropyl-trimethoxysilane, the solution was stirred for 24 h at ambient temperature.

14.56 g of 99% aluminium acetylacetonate ($[CH_3COCH\!=\!C(O\!-\!)CH_3]_3Al$, Sigma Aldrich) were weighed and added, followed by 318.34 g of methanol.

Stirring of the solution was continued for a further 1 h at ambient temperature, then the dry extract was measured.

The value was equal to 20%.

The quantity of solvent to be weighed and added must correspond to a dilution of 2.9%. The diluent was isopropanol (Carlo-Erba). The solution was stirred for 2 hours, filtered through a cartridge of porosity 3 μm, then stored in the freezer at −18° C.

For deposition, 1 mL of this solution was deposited by spin coating onto the lenses.

Medium Index Compositions (MI) of the Glymo/$SiO_2$ Optionally/Colloid of Rutile $TiO_2$ Type
M2:
25.44 g of glycidoxypropyltrimethoxysilane (Sivento) were weighed in a beaker and stirred. 5.81 g of 0.1N acid (HCl) were added dropwise to the solution. When all of the acid had been added, stirring of the hydrolysate was continued for a further 15 min. 80 g of colloid Optolake 1120Z (8RU-7.A8) (with 20% by weight of dry material) from Catalyst & Chemicals (CCIC) were weighed, 30 g of silica Oscal 1122A8 from CCIC were added. This solution was stirred for 15 min, then added to the hydrolysed glycidoxypropyltrimethoxysilane.

This mixture was stirred for 24 h at ambient temperature.

2.57 g of 99% aluminium acetylacetonate ($[CH_3COCH\!=\!C(O\!-\!)CH_3]_3Al$, Sigma Aldrich) were weighed and added to the solution. 56.18 g of methanol were added to the mixture.

Stirring of the solution was continued for a further 1 h at ambient temperature, then the dry extract is measured.

The value was equal to 20%.

The quantity of solvent to be weighed and added to the solution must correspond to a dilution of 2.6% of dry extract.

The diluent was isopropanol (Carlo-Erba). The solution was stirred for 2 hours, filtered through a cartridge of porosity 3 μm, then stored in the freezer at −18° C.

For deposition, 1 mL of this solution was deposited by spin coating onto the lenses.

M3:
The procedure was the same as for the solution M2 but the colloid Optolake 1120Z(8RU-7.A8) was replaced by the colloid Optolake 1120Z(8RU.A8), with 20% by weight of dry material.

M4

The procedure was the same as for the solution M2 but the colloid Optolake 1120Z(8RU-7.A8) was replaced by the colloid Optolake 1120Z(11RU-7.A8), with 20% by weight of dry material.

High Index Composition (HI) of the Glymo/Colloid of Non-Rutile Tio$_2$ Type

H1

98.9 g of glycidoxypropyltrimethoxysilane (Sivento) were weighed in a beaker and stirred. 22.65 g of 0.1N acid (HCl) were added dropwise to the solution. When all of the acid had been added, the hydrolysate was stirred for a further 15 min. 650 g of a colloid of TiO$_2$ (colloid 1120Z-U25-A8 from CCIC, with 20% by weight of dry material) were added.

The solution was stirred for 24 h at ambient temperature.

10 g of 99% aluminium acetylacetonate ([CH$_3$COCH=C(O—)CH$_3$]$_3$Al, Sigma Aldrich) were weighed and added to the solution. 218.5 g of methanol were added to the mixture.

Stirring of the solution is continued for a further 1 h at ambient temperature, then the dry extract was measured.

The value was equal to 20%.

The quantity of solvent to be weighed and added to the solution must correspond to a dilution of 3% of dry extract.

The diluent is isopropanol (Carlo-Erba). The solution was stirred for 2 hours, filtered through a cartridge of porosity 3 μm, then stored in the freezer at −18° C.

For deposition, 1 mL of this solution is deposited by spin coating onto the glasses.

High Index Composition (HI) of the Glymo/Colloid of Rutile TiO$_2$ Type

H2

90.45 g of glycidoxypropyltrimethoxysilane (Sivento) were weighed in a beaker and stirred. 20.66 g of 0.1N acid were added dropwise to the solution.

When all of the acid had been added, the hydrolysate was stirred for a further 15 min. 640 g of a colloid of TiO$_2$ colloid Optolake® 1120Z (8RU-7.A8) (with 20% by weight of dry matter) from CCIC were weighed, 160 g of methanol were added to the colloid solution and stirred at ambient temperature for 15 min.

800 g of the colloid-methanol solution were added to the hydrolysed glycidoxypropyltrimethoxysilane.

The solution was stirred for 24 h at ambient temperature.

9.14 g of 99% aluminium acetylacetonate ([CH$_3$COCH=C(O—)CH$_3$]$_3$Al, Sigma Aldrich) were weighed and added to the solution. 79.75 g of methanol were added to the mixture.

Stirring of the solution was continued for a further 1 h at ambient temperature, then the dry extract was measured.

The value was equal to 20%.

The diluent was isopropanol (Carlo-Erba). The quantity of solvent to be weighed and added to the solution must correspond to a dilution of 6% of dry extract. This new 6% solution was stirred for 5 hours, filtered through a cartridge of porosity 3 μm, then stored in the freezer at −18° C.

For deposition, 1 mL of this solution is deposited by spin coating onto the lenses.

H3:

The procedure was the same as for the solution H2 but the colloid Optolake 1120Z(8RU-7.A8) was replaced by the colloid Optolake 1120Z(8RU.A8), with 20% by weight of dry material.

H4:

The procedure was the same as for solution H2 but the colloid Optolake 1120Z(8RU-7.A8) was replaced by the colloid Optolake 1120Z(11RU-7.A8).

Starting from the different compositions thus prepared, several examples of lenses each comprising a substrate, a varnish and an anti-reflection stack were produced in the following manner:

Deposition of the Multi-Layer Anti-Reflection Stack

Organic glass substrates made of polycarbonate (PC) or polymers of diethylene glycol di(allylcarbonate) (CR 39®) having one face coated with an anti-abrasion layer (HC) described hereafter or a glaze (HT-450 (mixture of acrylic polymers and a photoinitiator dissolved in alcohols (propanol derivatives)/UV glaze marketed by LTI Coburn) were coated by means of "spin coating" on their face already coated with a (HI) layer, on which is also deposited by "spin coating" a (LI) layer so as to constitute a glass coated with an anti-reflection stack according to the invention.

The HC anti-abrasion coating was obtained by deposition and hardening of a composition comprising by weight 224 parts of GLYMO, 80.5 parts of 0.1N HCl, 120 parts of dimethyldiethoxysilane, 718 parts of 30% colloidal silica in methanol, 15 parts of aluminium acetylacetonate and 44 parts of ethylcellosolve. The composition also contained 0.1% with respect to the total weight of the composition of a surfactant FLUORAD FC 430 from 3M. The different steps of the procedure are described in detail hereafter:

the substrate was fixed to a rotating support of adjustable speed, a volume ranging from 0.5 to 5 mL of the (HI) solution was deposited in 0.3 s at the centre of the substrate, the speed of rotation of the support was then adjusted to 1750-2300 rev/min, so as to obtain by spin the coating of the substrate with a film of material of high refractive index (spintime: 15 s), the substrate thus coated was then subjected for 16 s to an infrared heat pre-treatment such that the temperature of the coated substrate surface was 80 to 90° C., the coated substrate was then cooled for 10 to 50 s with a stream of air at a temperature equal to or less than ambient temperature, a volume ranging from 0.5 and 5 mL of the (LI) solution was then deposited in 0.3 s onto the coated substrate, the speed of rotation of the support is then fixed at 1 900-2 000 rev/min, so as to obtain by spin the coating with a film of material of low refractive index (spin time: 15 s).

A substrate coated with an anti-reflection stack according to the invention was thus obtained, comprising successively a film of material of high refractive index and a film of material of low refractive index, which was then subjected for 8s to an infrared heat pretreatment.

The pre-baking carried out was the same at each step: it consisted of heating the surface of the lens with an infrared (IR) device. An infrared ceramic material with 450 W power was brought near the lens surface. The temperature of the surface of the lens passed from 25° C. to 70-80° C. at the end of the pre-baking step.

Cooling consisted in directing a stream of air at ambient temperature onto the surface of the lens.

Final Heat Treatment

The optical glass coated with the anti-reflection stack according to the invention was then subjected to a final heat treatment that consists of heating by infrared or by a blast of hot air in an oven, a tunnel furnace or any other system making it possible to heat at least the surface of the lens. The duration of the treatment may vary from several minutes to several hours.

During this final heat treatment, the surface of the lens reached a temperature ranging from 90 to 140° C.

Cooling the lens can be achieved by allowing the lens to attain ambient temperature or by a stream of air at a temperature equal to or less than ambient temperature for a time varying from several seconds to several tens of minutes.

As examples, it is possible to use for the heat treatment an oven of the following type:

Convective Dima oven. Heating lasted 40 min., and the maximal temperature (T° max) attained at the lens surface was ~95° C. (the temperature rose from ambient (25° C.) to 95° C. in approximately 5 minutes, then the temperature was maintained at 95° C. for 35 minutes).

Convective Dima oven—13 min., T° max attained at the lens surface was ~100° C.

IR Dima oven—40 min, T° max attained at the lens surface was ~100/110° C.

Rapid convective (<5 min): hot air pistol, T° max attained at the lens surface was ~170° C.

Thus, under the conditions indicated in the appended Table 1, a first series of examples numbered from 1 to 11 were produced.

In the examples 8 to 11 the anti-reflection stack was constituted of two layers (HI/LI).

In the examples 1 to 7 (the examples 1 to 4 being examples for comparison), the anti-reflection stack was constituted of three layers (MI/HI/LI).

The spin speeds, the pre-baking and cooling times for the film MI are indicated in Table 1.

The lenses of the examples were subjected to a durability test (called QUV S&P test) under the conditions specified hereafter:

The test was performed on a device Q PANEL, model QUV.

The lens was placed for two hours in a chamber at 45° C. and in an atmosphere saturated with water (condensation of water on the surface of the lens). The condensation of water was then stopped and the lens was subjected to UV radiation (0.75 W/m$^2$/nm) for two hours at 45° C.

The lens was then left for three hours without irradiation at 45° C. with renewed condensation of water.

Then, finally, the lens was subjected to UV irradiation (0.75 W/m$^2$/nm) for three hours at 45° C., without condensation.

The above test was repeated several times.

A mechanical stress was exerted on this lens every 10 hours.

The test was stopped when the mechanical stress induced an appreciable degradation of the anti-reflection stacking.

The mechanical test performed was the following:

A synthetic microfibre cloth, that can be obtained from an optician, was used for cleaning optical lenses.

The cloth, constituted of polyamide and Nylon® filaments, must have the following minimal dimensions: 30 mm×30

TABLE 1

| Ex. | Substrate | Hard coat | Surface preparation | Solution 1 | Deposition speed rev/min | Pre-baking time (s) | Cooling time (s) | Solution 2 | Deposition speed rev/min |
|---|---|---|---|---|---|---|---|---|---|
| 1 | CR39 | HC | 10% aqueous soda solution | M1 | 2000 | 18" | 11" | H1 | 2200 |
| 2 | CR39 | HC | 10% aqueous soda solution | M2 | 2000 | 18" | 11" | H2 | 1400 |
| 3 | CR39 | HC | Idem | M3 | 2300 | 18" | 11" | H3 | 1500 |
| 4 | CR39 | HC | Idem | M4 | 1900 | 16" | 10" | H4 | 1900 |
| 5 | CR39 | HC | Idem | M2 | 2000 | 18" | 11" | H2 | 1400 |
| 6 | CR39 | HC | Idem | M3 | 2100 | 18" | 11" | H3 | 1500 |
| 7 | CR39 | HC | Idem | M4 | 2200 | 18" | 11" | H4 | 1400 |
| 8 | CR39 | HC | Idem | H4 | 2200 | 16" | 50" | B2 | 1850 |
| 9 | PC | HT-450 | Soap-water | H4 | 1750 | 16" | 50" | B2 | 1700 |
| 10 | PC | HT-450 | Soap-water | H4 | 1750 | 16" | 50" | B2 | 1700 |
| 11 | CR39 | HC | 10% aqueous soda solution | H4 | 2100 | 16" | 50" | B2 | 1850 |

| Ex. | Pre-baking time (s) | Cooling time (s) | Solution 3 | Deposition speed rev/min | Pre-baking time (s) | Cooling time (s) | Final heat treatment (minutes) |
|---|---|---|---|---|---|---|---|
| 1 | 16" | 16" | B1 | 1700 | 8" | 15" | 40 mn-Dima IR |
| 2 | 16" | 16" | B1 | 1600 | 8" | 15" | 40 mn-Dima IR |
| 3 | 16" | 15" | B1 | 1600 | 11" | 15" | 40 mn-Dima IR |
| 4 | 16" | 25" | B1 | 2000 | 8" | 25" | 40 mn-Dima convective |
| 5 | 16" | 16" | B2 | 1500 | 8" | 15" | 40 mn-Dima convective |
| 6 | 16" | 15" | B2 | 1600 | 11" | 15" | 40 mn-Dima convective |
| 7 | 16" | 16" | B2 | 1600 | 8" | 15" | 40 mn-Dima convective |
| 8 | 8" | 50" | | | | | 40 mn-Dims convective |
| 9 | 8" | 50" | | | | | 40 mn-Dima convective |
| 10 | 8" | 50" | | | | | 13 mn-Dima convective |
| 11 | 8" | 50" | | | | | 5 mn rapid convective |

The examples 1 to 4 are comparative examples mm, a thickness of 0.35 mm to 0.45 mm with a minimal fibre density of 10000/cm². An example of such a cloth is the one manufactured by KANEBO company under the trade name Savina Minimax®.

The cloth was immersed in deionised water for at least two minutes, until it was impregnated with water.

The cloth was then recovered, folded in three superimposed layers and placed on the central area of the lens. An eraser 6.5 to 7 mm in diameter was then applied to the centre of the cloth. A force of 5±1N was applied to this eraser and a forwards-and-backwards movement was made over a distance of 30 mm (the midpoint of the movement being centred on the centre of the lens) by performing one cycle (one to-and-fro movement) per second.

A total of 25 cycles were performed, then the lens was turned through 90°. A further 25 cycles were performed.

The lens was then examined visually by the naked eye.

Placed against a black background, the lens was examined in reflection.

The source of the reflected beam was a 200 lux source.

The areas where the anti-reflection stack was delaminated appeared luminous.

A lens was considered as having appreciable degradation of the anti-reflection if more than 5% of the surface of the lens in the central area 20 mm in diameter was delaminated by being subjected to the mechanical stress.

The results are given in Tables 2 (comparative examples 1 to 4) and 3 (examples according to the invention) below.

TABLE 2

| System | Duration of the test prior to deterioration |
|---|---|
| Example 1* | 50 h |
| Example 2* | 70 h |
| Example 3* | 60 h |
| Example 4* | 70 h |

*Comparative examples

TABLE 3

| System | Duration of the test prior to deterioration |
|---|---|
| Example 5 | 240 h |
| Example 6 | 240 h |
| Example 7 | 260 h |
| Example 8 | 220 h |

The results show that the anti-reflection stacks according to the invention have a duration prior to deterioration much longer than that of the stacks of the comparative examples. In particular, the stack of example 5 of the invention, which differs from comparative example 2 only in the use of the low index layer L2 (instead of the layer L1) has a duration prior to deterioration more than 3 times longer than that of comparative example 2.

In order to check the optical properties, the Rm index (mean of the reflection between 400 and 700 nm) was determined according to the standard ISO/WD 8980-4 and it was possible to observe the effects indicated in the following Tables:

TABLE 4

| Effect of the low index: | |
|---|---|
| System | Rm |
| Example 1 | 2.0-2.2 |
| Example 5 | 1.4 |
| Example 6 | 1.2 |
| Example 7 | 1.3 |
| Example 8 | 1.1-1.3 |

TABLE 5

| Effect Substrate/ anti-abrasion (HC) coating: | |
|---|---|
| System | Rm |
| Example 8 | 1.1-1.3 |
| Example 9 | 1.1 |

On the other hand, it appears that good mechanical properties are obtained, even for very rapid heat treatment. Thus, the examples 8 and 11, subjected to treatment for 40 nm and 5 nm respectively, give the following results:

TABLE 6

| System | Steel wool | N10 strokes | Bayer sand |
|---|---|---|---|
| Example 8 | 3 | 12 | 3 ± 1 |
| Example 11 | 3 | 12 | 3 ± 1 |

The static contact angle with water was also measured on the surface of the anti-reflection-treated lenses according to the invention (examples 5 to 11) and those of the comparative examples. The results are shown in Table 7.

TABLE 7

| Examples | Contact angle (with water) |
|---|---|
| 1-4 (comparatives) | 75° |
| 5-11 | 100° |

A high contact angle reveals good anti-fouling properties. In all of these examples, the solvent used for the dilution of the different solutions was isopropanol (($CH_3)_2CHOH$), Carlo Erba).

The fluorosilane used in the examples was: $CF_3(CF_2)_5CH_2CH_2Si(OC_2H_5)_3$.

Other examples were also prepared under the following conditions:

Preparation of the Composition HI

The composition of high refractive index is formulated in two steps.

1. A first solution, called stock solution (HI), is first prepared by proceeding in the following manner:
   20.7 parts of 0.1N hydrochloric acid were added dropwise to a solution that contains 90.5 parts of GLYMO, 800 parts by weight of Optolake 1120Z® (11RU7-A.8),
   the hydrolysed solution was stirred for 24 h at ambient temperature,
   then 9.1 parts of aluminium acetylacetonate and 79.8 parts of a mixture of the following solvents: 2-propanol, 4-hydroxy-4-methyl-2-pentanone and pentanone were added to the composition.

The solution obtained constitutes the stock solution (HI)
The theoretical dry extract of the stock solution was in the order of 20% of solid matter.

(i) A working solution (HI) was then prepared from the stock solution (HI) by diluting the latter with a mixture of solvents. For this purpose, the following were added to 100 g of the stock solution (HI):
163.6 g of 2-propanol,
70 g of 2-butanone.

The solution obtained constitutes the working solution HI, the theoretical dry extract of which was 6%.

Preparation of the Composition (LI)

The composition (LI) is also formulated in two steps.

1. A first solution, called stock solution (LI) was first prepared by adding 26.3 parts of 0.1N hydrochloric acid dropwise to a solution containing 65.6 parts of tetraethoxysilane (TES) and 8.1% of fluorosilane.

The solution obtained constitutes the stock solution LI and the theoretical dry extract of this solution was 30±1%.

2. A working solution (LI) was then prepared from the stock solution (LI) by diluting the latter with a mixture of solvents.

For that purpose, 0.28 g of Polycat® SA 1/110, 737.7 g of 2-methyl-2-butanol, and 316.2 g of 2-butanone were added to 100 g of stock solution (LI). A solution was obtained that constitutes the working solution (LI), the theoretical dry extract of which was in the order of 2.6%.

Starting from the compositions (HI) and (LI) thus prepared, a second series of examples was performed by deposition of an anti-reflection stack onto a transparent substrate under the conditions indicated above for the first series.

Thus, three examples of lenses were prepared:

EXAMPLE A

A lens ORMA® was coated with an anti-reflection stack according to the invention, itself coated with a varnish based on a silane hydrolysate such as described in the U.S. patent application Ser. No. 08/681,102 in the name of the applicant, and more particularly such as described in example 3.

EXAMPLE B

A polycarbonate substrate coated with a UV varnish marketed under the trade name HT450® by LTI Coburn company, such as previously described, was coated with an anti-reflection stack according to the invention.

EXAMPLE C

A polycarbonate substrate coated with a varnish marketed under the trade name L5051® by LESCO company was coated with an anti-reflection stack according to the invention.

Properties

The coated substrates of the examples A to C were subjected to the tests specified previously in order to evaluate their performance. The results concerning the optical properties are presented in Table 8 below.

TABLE 8

| Substrate | Rm (%) |
|---|---|
| Example A | 1.3 |
| Example B | 1.1 |
| Example C | 1.1 |

The values of the mean reflection (Rm) show that the examples A, B and C comprising an anti-reflection stack constituted of two layers and produced according to the invention are high-performance anti-reflection stacks.

The results concerning the properties of adhesion and resistance to abrasion are presented in the Tables below.

TABLE 9

| Substrate | Surface preparation | Nx10 strokes | Bayer sand |
|---|---|---|---|
| Example A | Alcoholic bath or plasma | 12 | 2-4 |
| Example B | Soap/water | 12 | 1-2 |
| Example C | Soap/water | 12 | 1-2 |

The examples A, B and C show good adhesion (test N×10 strokes), (a standard anti-reflection glass having values of N×10 strokes in the order of 3) and good resistance to abrasion.

The preparation of the surface of the anti-abrasion coating makes it possible to obtain a good level of adhesion. A simple cleaning with soap and water makes it possible to obtain good adhesion of the anti-reflection stack according to the invention to photopolymerisable varnishes such as those described in the examples B and C.

TABLE 10

| Substrate | SW** | QUV-S&P |
|---|---|---|
| Example A | 3 | >200 h |
| Example B | 5 | >80 h |
| Example C | 5 | >100 h |

**SW: steel wool test

Examples A, B and C reveal very good durability.
Example A shows good resistance in the steel wool test.
Examples B and C show less resistance in the steel wool test, which is essentially due to the nature of the varnishes HT450® and L5051® used.

The invention claimed is:

1. An article comprising a substrate having at least one main surface coated with a multi-layer anti-reflection stack, wherein the multi-layer anti-reflection stack comprises, in the order indicated starting from the substrate:
    (a) a high index (HI) layer, having a refractive index $n_D^{25}$ of 1.50 to 2.00 and resulting from the hardening of a first hardenable composition and comprising an organic-inorganic hybrid matrix resulting from the hydrolysis and condensation of at least one precursor compound bearing an epoxy or (meth)acryloxy group and at least two functions hydrolysable to silanol groups, within which at least one colloidal metal oxide or at least one colloidal chalcogenide or a mixture of these compounds is dispersed in the form of particles from 2 to 50 nm in diameter, and directly on this high index layer (HI):
    (b) a low index (LI) layer, having a refractive index $n_D^{25}$ ranging from 1.38 to 1.44 obtained by deposition and hardening of a second hardenable composition and comprising the product of hydrolysis and condensation of:
        (i) at least one precursor compound (I) comprising four hydrolysable functions per molecule of formula

Si(W)$_4$ in which the groups W, identical or different, are hydrolysable groups and provided that the groups W do not all represent at the same time a hydrogen atom, (ii) at least one precursor silane (II) bearing at least one fluorinated group and comprising at least two hydrolysable groups per molecule, said second composition comprising at least 10% by mass of fluorine in its theoretical dry extract (TDE), and the molar ratio I/(I+II) of the precursor compound (I) to the sum of the precursor compound (I)+precursor silane (II) of the second composition is at least 90%.

2. An article comprising a substrate having at least one main surface coated with a multi-layer anti-reflection stack, wherein the multi-layer anti-reflection stack comprises, in the order indicated starting from the substrate:

(a) a high index (HI) layer, having a refractive index $n_D^{25}$ of 1.50 to 2.00 and resulting from the hardening of a first hardenable composition and comprising an organic-inorganic hybrid matrix resulting from the hydrolysis and condensation of at least one precursor compound bearing an epoxy or (meth)acryloxy group and at least two functions hydrolysable to silanol groups, within which at least one colloidal metal oxide or at least one colloidal chalcogenide or a mixture of these compounds is dispersed in the form of particles from 1 to 100 nm in diameter, and directly on this high index layer (HI):

(b) a low index (LI) layer, having a refractive index $n_D^{25}$ ranging from 1.38 to 1.44 obtained by deposition and hardening of a second hardenable composition and comprising the product of hydrolysis and condensation of:

(i) at least one precursor compound (I) comprising four hydrolysable functions per molecule of formula Si(W)$_4$ in which the groups W, identical or different, are hydrolysable groups and provided that the groups W do not all represent at the same time a hydrogen atom; and (ii) at least one precursor silane (II) bearing at least one fluorinated group and comprising at least two hydrolysable groups per molecule, said second composition comprising at least 10% by mass of fluorine in its theoretical dry extract (TDE), and the molar ratio I/(I+II) of the precursor compound (I) to the sum of the precursor compound (I)+precursor silane (II) of the second composition is at least 90%.

3. The article of claim 2, wherein the colloidal metal oxides and chalcogenides dispersed in the matrix of the high index layer is TiO$_2$, ZnO, ZnS, ZnTe, CdS, CdSe, IrO$_2$, WO$_3$, Fe$_2$O$_3$, FeTiO$_3$, BaTi$_4$O$_9$, SrTiO$_3$, ZrTiO$_4$, MoO$_3$, CO$_3$O$_4$, SnO$_2$, bismuth-based ternary oxide, MoS$_2$, RuO$_2$, Sb$_2$O$_4$, MgO, CaTiO$_3$, V$_2$O$_5$, Mn$_2$O$_3$, CeO$_2$, Nb$_2$O$_5$, or RuS$_2$.

4. The article of claim 2, wherein the particles of metal oxide dispersed in the matrix of the high index layer are constituted by a composite titanium oxide in the form of rutile.

5. The article of claim 4, wherein the mineral particles dispersed in the organic-inorganic hybrid matrix of the high index layer (HI) have a composite structure based on TiO$_2$, SnO$_2$, ZrO$_2$ and SiO$_2$.

6. The article of claim 5, wherein at least 65% by mass of the theoretical dry extract (IDE) of the low index layer are derived from the precursor compound (I).

7. The article of claim 6, wherein at least 70% by mass of the theoretical dry extract (TDE) of the low index layer are derived from the precursor compound (I).

8. The article of claim 2, wherein the molar ratio I/(I+II) of the precursor compound (I) to the sum of the precursor compound (I)+precursor silane (II) is at least 95%.

9. The article of claim 2, wherein the hydrolysable groups W represent an OR, Cl or H group, R being alkyl.

10. The article of claim 2, wherein the hardenable composition of the low index layer (LI) comprises a tri- or dialkoxysilane different from the silanes of the precursor compound (I) of formula Si(W)$_4$ and from the precursor fluorosilane (II) in a proportion by weight not exceeding 10% of the total weight of the silanes present in said composition.

11. The article of claim 2, wherein the hardenable composition of the low index layer (LI) does not comprise silanes other than the precursor compound (I) and the precursor fluorosilane (II).

12. The article of claim 2, wherein the anti-reflection stack consists of a high index layer (HI) coated with a low index layer (LI).

13. The article of claim 2, wherein the anti-reflection stack comprises at least three superimposed layers, starting from the substrate, a medium index layer (MI), a high index layer (HI) and a low index layer (LI), respectively, the medium index layer (MI) having a refractive index $n_D^{25}$ of 1.45 to 1.80.

14. The article of claim 2, wherein the layer of material of high refractive index (HI) has a refractive index greater than 1.7.

15. The article of claim 14, wherein the layer of material of high refractive index (HI) has a refractive index ranging from 1.72 to 1.82.

16. The article of claim 15, wherein the layer of material of high refractive index (HI) has a physical thickness ranging from 80 to 150 nm.

17. The article of claim 16, wherein the layer of material of low refractive index (LI) has a physical thickness ranging from 40 to 150 nm.

18. The article of claim 2, wherein the organic matrix of the composition (HI) is a hydrolysate of an epoxyalkoxysilane.

19. The article of claim 18, wherein the epoxyalkoxysilane contains an epoxy group and three alkoxy groups, these latter being directly linked to the silicon atom.

20. The article of claim 19, wherein the epoxyalkoxysilane corresponds to the formula (I):

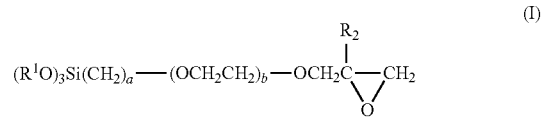

in which:

R$^1$ is an alkyl group of 1 to 6 carbon atoms,

R$^2$ is a methyl group or a hydrogen atom, a is an integer between 1 and 6, b represents 0, 1 or 2.

21. The article of claim 2, wherein the hardenable composition of the high index layer (HI) is combined with a catalyst constituted of an aluminum compound selected from:

aluminum chelates, compounds of formula (II) or (III):

in which:

R and R' are linear or branched chain alkyl groups of 1 to 10 carbon atoms,

R" is a linear or branched chain alkyl group of 1 to 10 carbon atoms, a phenyl group, or a group

in which R has the meaning specified above, and n is an integer from 1 to 3, and an organic solvent, the boiling point T of which, at atmospheric pressure, ranges from 70° C. to 140° C., being present in the hardenable composition (HI) when the catalyst is an aluminum chelate.

22. The article of claim 2, wherein the precursor compound (I) of the second hardenable composition (LI) is a tetraalkoxysilane.

23. The article of claim 2, wherein precursor silane (II) is selected from perfluorosilanes.

24. The article of claim 2, further comprising a hydrophobic anti-fouling coating deposited onto the anti-reflection coating.

25. A process for the manufacture of an article according to claim 2, comprising:

depositing onto at least one of the surfaces of the substrate optionally coated with an anti-abrasion coating or a primer layer and an anti-abrasion coating at least one layer of material of high refractive index (HI), by application and then hardening of a first hardenable composition (HI) comprising an organic-inorganic hybrid matrix resulting from the hydrolysis and condensation of at least one precursor compound bearing an epoxy or (meth)acryloxy group and at least two functions hydrolysable to silanol groups, within which at least one metal oxide and/or at least one chalcogenide is dispersed in the form of particles having a diameter of 1 to 100 nm; and depositing onto said layer (HI) of at least one layer of material of low refractive index (LI), by application and then hardening of a second hardenable composition, said second hardenable composition comprising the product of hydrolysis and the condensation of:

(i) at least one precursor compound (I) comprising four hydrolysable functions per molecule of formula

in which the groups W, identical or different, are hydrolysable groups and provided that the groups W do not all represent at the same time a hydrogen atom, and (ii) at least one precursor silane (II) bearing at least one fluorinated group and comprising at least two hydrolysable groups per molecule, said second composition comprising at least 10% by mass of fluorine in its theoretical dry extract (TDE), and the molar ratio I/(I+II) of the precursor compound (I) to the sum of the precursor compound (I)+precursor silane (II) of the second composition is at least 90%.

26. The process of claim 25, wherein the layers of material of high refractive index (HI) and low refractive index (LI) are deposited by dip coating or spin coating.

27. The process of claim 25, further comprising, between the deposition of the layer of material of high refractive index (HI) and that of the layer of material of low refractive index (LI), a surface treatment of the layer (HI) in order to prepare the surface for the deposition of the layer (LI).

28. The process of claim 27, wherein the treatment of the surface of the layer of material of high refractive index (HI) is an infrared treatment, followed by cooling by a stream of air at ambient temperature.

29. The process of claim 25, wherein the molar ratio I/(I+II) of the precursor compound (I) to the sum of the precursor compound (I)+precursor silane (II) is at least 95%.

* * * * *

UNITED STATES PATENT AND TRADEMARK OFFICE
CERTIFICATE OF CORRECTION

Page 1 of 1

PATENT NO. : 8,142,896 B2
APPLICATION NO. : 12/490000
DATED : March 27, 2012
INVENTOR(S) : John Biteau et al.

It is certified that error appears in the above-identified patent and that said Letters Patent is hereby corrected as shown below:

In title page, item (54) Title, line 3 and in column 1, line 3, in the title, delete "of" and insert --for-- therefor.

In claim 6, column 23, line 58, delete "(IDE)" and insert --(TDE)-- therefor.

In claim 20, column 24, lines 41-47, delete chemical drawing and insert

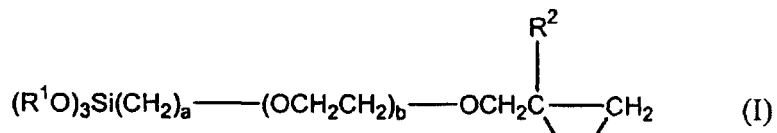

-- -- therefor.

Signed and Sealed this
Fifteenth Day of May, 2012

David J. Kappos
*Director of the United States Patent and Trademark Office*